United States Patent [19]
Borgida et al.

[11] Patent Number: 5,806,060
[45] Date of Patent: *Sep. 8, 1998

[54] INTERACTIVE DATA ANALYSIS EMPLOYING A KNOWLEDGE BASE

[75] Inventors: Alexander Tiberiu Borgida, Highland Park; Ronald Jay Brachman, Westfield; Thomas Kirk, Warren; Peter Gilman Selfridge, Cranford; Loren Gilbert Terveen, Basking Ridge, all of N.J.

[73] Assignee: NCR Corporation, Dayton, Ohio

[*] Notice: The term of this patent shall not extend beyond the expiration date of Pat. No. 5,659,724.

[21] Appl. No.: 839,048

[22] Filed: Apr. 23, 1997

Related U.S. Application Data

[63] Continuation of Ser. No. 972,785, Nov. 6, 1992, Pat. No. 5,659,724.

[51] Int. Cl.[6] ............................................. G06F 17/30
[52] U.S. Cl. .................................... 707/3; 395/51; 395/60
[58] Field of Search ................................. 707/3, 10, 101; 395/51, 60

[56] References Cited

FOREIGN PATENT DOCUMENTS

0542430 A3  10/1992  European Pat. Off. ...... G06F 15/403

OTHER PUBLICATIONS

R. Agrawal, et al., "An Interval Classifier for Database Mining Applications," Proc. of the 18th VLDB Conf., Vancouver, B.C., Canada, Aug. 1992.

T. Anand, et al., "Making Sense of Gigabytes: A System for Knowledge–Based Market Analysis," Proc. of the AAAI Conf. on Innovative Applications of Al, San Jose, CA, Jul. 1992.

T. Anand, et al., "Spotlight: A Data Explanation System," Proc. of the 8th IEEE Conf. on Al for Applications, Monterey, CA, Mar. 1992.

T.M. Anwar, et al., "Knowledge Mining in Databases: A Unified Approach through Conceptual Clustering," submitted for publication, no date.

T.M. Anwar, et al., "Conceptual Clustering in Database Systems," Proc. of the American Society for Information Science, Special Interest Group on Classification Research Workshop, Washington, D.C., Oct. 1991.

T.M. Anwar, et al., "Knowledge Mining by Imprecise Querying: A Classification–Based Approach," Proc. of the 8th Int'l conf. on Data Engineering, Tempe, AZ, Feb. 3–7, 1992, pp. 622–630.

V. Dhar, et al., "Abstract–Driven Pattern Discovery in Databases," Center for Research on Information Systems, NYU, Working Paper Series STERM IS–92–11, Mar. 1992.

"Cross Target," Dimensional Insight, Inc., 99 S. Bedford St., Burlington, MA 01803, no date.

(List continued on next page.)

*Primary Examiner*—Paul R. Lintz
*Assistant Examiner*—Maria N. Von Buhr

[57] ABSTRACT

An information retrieval system implemented as a virtual data base management system which uses a knowledge base management system to provide a problem-oriented conceptual schema for one or more standard data base management systems. In the conceptual schema, a hierarchy of concepts is used to organize individual objects. A classifier determines which concepts an individual object is a representative of and determines the relationship of new concepts to existing concepts. The use of a knowledge base with a classifier permits conversion of queries into concepts and detection of changes in the relationships between individual objects and the concepts. A window-based user interface permits flexible and experimental access to the information. Special features of the user interface permit the user to specify conversion of a query into a concept, to establish monitors to detect such changes, and to define a query by specifying a portion of a graph.

6 Claims, 9 Drawing Sheets

OTHER PUBLICATIONS

C. Kellog, et al., "Intelligent Data Exploration and Analysis," Proc. of the ISMM Int'l. Conf. on Information and Knowledge Management (CIKM–92) Baltimore, MD, Nov. 1992.

G. Piatetsky–Shapiro, et al., "Knowledge Discovery Workbench for Exploring Business Databases," Int'l. Journal of Intelligent Systems, v.7, 1992, pp. 675–686.

T. Ichikawa, "KDA: A Knowledge–Based Database Assistant with a Query Guiding Facility," IEEE Transactions on Knowledge and Data Engineering, v.4, n.5, Oct. 1992.

M. Stonebraker, "The Integration of Rule Systems and Database Systems," IEEE Transactions on Knowledge and Data Engineering, v.4, n.5, Oct. 1992.

E. Mays, et al., "Experiance with K–Rep: An Object–Centered Knowledge Representation Language," Proc. of the 4th Conf. on Artifical Intelligence Applications, San Diego, CA, Mar. 14, 1988, pp. 62–67.

R.J. Brachman, et al., "The CLASSIC Knowledge Representation System or, KL–ONE: The Next Generation," Proc. of the Int'l. Conf. on 5th Generation Computer Systems, 1992, pp. 1036–1043.

G. Jakobson, "Expert Front Ends in the Environment of Multiple Information Sources," AFIPS Conf. Proc., v.56, Jun. 15, 1987, pp. 611–612.

INTERACTIVE DATA ANALYSIS EMPLOYING A KNOWLEDGE BASE

This is a continuation of application Ser. No. 07/972,785, filed on Nov. 6, 1992 now Pat. No. 5,659,724, issued Aug. 18, 1997.

BACKGROUND OF THE INVENTION

1. Field of the Invention

The invention relates to data analysis generally and more specifically to data analysis performed using knowledge base systems.

2. Description of the Prior Art

In the computer age, information is stored primarily in data base management systems. FIG. 1 is a schematic block diagram of a data base management system (DBMS) 101. System 101 is implemented using storage devices such as disk drives to store the information and processors coupled to the disk drives to access the data. In system 101, a query 103, which describes the information to be located, is presented to DBMS 101, which processes the query in query manager 107, locates the information in data base 117, and returns it as data 105. Query 103 describes the information to be located by using names. For example, a query in the SQL query language has the following general form:

```
select <field names>
from <table names>
where <constraints that rows must satisfy>
```

Of course, the information in data base 117 is not located by names, but rather by means of addresses in whatever storage device data base 117 is implemented on. The relationship between the names used in the queries 103 and the addresses used in data base 117 is established by schema 113, which defines the names used in the queries in terms of the locations in data base 117 which contain the data referred to by the names.

Operation of data base management system 101 is as follows: Query 103 is received by query manager 107, which parses it. query manager 107 presents the names 109 in query 103 to schema 113, which returns descriptors 111 describing the data represented by the names in data base 117. Query manager 107 then uses the descriptors and the query 103 to produce a stream of operations 112 which cause data base 117 to return the data 105 specified by query 103. Query manager 107 then returns the data 105 to the user who produced the query.

Data base management systems 101 are effective for storing and retrieving data; they do. however have a number of problems. One of the problems is complexity; query languages such as SQL are not simple. Further, schema 113 in a large data base management system 101 is also complex. Effective formulation of queries 103 requires detailed understanding not only of the query language used in system 101 but also of the meanings of the names used in schema 113. For this reason, formulation of queries for system 101 is often left to specialists. The overhead involved here is considerable in any case and grows if different data base management systems 101 with different query languages are involved. Attempts to overcome the complexity of query writing have included techniques such as the following:

- Forms which the user fills out interactively. The queries are generated from the forms.
- Redefinition of the names used in schema 113 in terms of concepts familiar to the user of the system.
- Natural language interfaces to data base management system 101.

A modern example of such techniques is BusinessObjects, in which an SQL expert relates forms employing terms with which the user is familiar to queries in the SQL query language. By filling out the forms, the user can generate SQL queries without knowing the SQL query language. While the above techniques are worthwhile, none of them is able to deal with situations in which the information of interest is contained in more than one kind of data base management system 101.

Another problem with data base management system 101 is the relative inflexibility of its organization. Changes to schema 113 may be made only by specialists intimately familiar with schema 113 and its relationship to data base 117. Indeed, in many systems 101, schema 113 is produced by compilation, and consequently, a change to schema 113 requires recompiling the entire data base management system 101. The inflexibility of the organization causes problems both for data base management system 101's design and for its later use. Because of the inflexibility of the organization, it is difficult and expensive to design schema 113 for a data base management system 101. In particular, it is difficult to use the technique of producing a prototype and experimenting with it to determine the best form for the final system. Because of the inflexibility of the organization, it is also difficult to access the data in data base 117 in ways unenvisioned in the original design of schema 113. This problem has become more important as the information in large data base management systems 101 has been used not only for its originally-intended purposes, but also as a resource for various kinds of research. Since the schema of the data base management system was set up for the original purpose, it is difficult to fashion queries which look at the information in the manner required for the research.

The above and other problems of data base management systems 101 may be solved by employing knowledge base management systems in conjunction with data base management systems. In the present context, the chief distinction between a knowledge base management system and a data base management system is this: in a data base management system, the designer of schema 113 uses his or her conceptual knowledge of the data in data base 117 to design schema 113; however, schema 113 and the query language do not reflect the conceptual knowledge. For example, in systems using SQL, queries specify data by specifying tables and rows and columns in the tables. In a knowledge base management system on the other hand, both the equivalent to the schema and the language used to describe data reflect the conceptual knowledge. U.S. patent application 07/781, 464, Borgida et al., *Information Access Apparatus and Methods,* filed Oct. 23, 1991, and assigned to the assignees of the present patent appication, describes generally how a knowledge base management system may be used in conjunction with a data base system; the present patent application presents more detail concerning the uses and advantages of integrating knowledge base management systems with data base management systems.

SUMMARY OF THE INVENTION

The foregoing problems of prior-art data base management systems are solved by a virtual data base management system. The virtual knowledge base management system includes

- one or more data base management systems for receiving first queries and returning data in response thereto;
- a knowledge base management system for organizing the data in a knowledge base according to a set of concepts and operating on the data in response to expressions stated in a description language which employs the concepts;

means for receiving the expressions, translating the expressions into the first queries, receiving the data, and returning the data together with the expressions to the knowledge base management system for incorporation into the knowledge base; and means for receiving second queries specifying certain of the data and responding thereto by translating the second queries into expressions specifying the certain data, providing the expressions to the knowledge base management system, receiving the certain data from the knowledge base management system, and providing the certain data.

The fact that the virtual data base management system includes a knowledge base management system gives the virtual data base management system the ability to perform novel operations including converting a query into a concept used in the knowledge base management system and tracking movement of an individual in the knowledge base management system from one category to another. As regards query conversion, that aspect of the invention may be summarized as follows: Apparatus for organizing a body of information including A knowledge base wherein the body of information is represented by individuals and concepts which organize the individuals;

means coupled to the knowledge base for responding to a query specifying a collection of the individuals by making a collection specification which specifies the same collection of individuals and has a form compatible with the concepts; and means coupled to the knowledge base for receiving the collection specification and integrating the collection specification into the concepts.

As regards tracking movement of an individual from one category to another, that aspect of the invention may be summarized as follows: Apparatus for detecting a change in a body of information including A knowledge base wherein the body of information is represented by individuals and concepts which organize the individuals;

means for making an alteration with regard to one or more of the individuals;

means responsive to the alteration for making a reorganization of the individuals as required by the alteration and the concepts; and means responsive to the reorganization for indicating an effect of the reorganization with regard to one or more of the individuals.

Finally, the virtual data base management system employs a technique for generating a query from a graph which may be employed in any kind of data base management system. In that aspect, the invention may be summarized like this: Apparatus for making a new query including display means for displaying a graph based on information associated with individuals belonging to a first collection;

means corresponding to the display means for storing a first collection specification specifying the first collection and a query language expression for obtaining the information upon which the graph is based;

means coupled to the display means for making a specification of a portion of the graph; and means responsive to the first collection specification, the query language expression, and the means for making a specification for making the new query, the new query specifying a second collection made up of the individuals with which the information in the portion is associated.

Other objects and advantages of the apparatus and methods disclosed herein will be apparent to those of ordinary skill in the art upon perusal of the following Drawing and Detailed Description, wherein:

Figure 1:
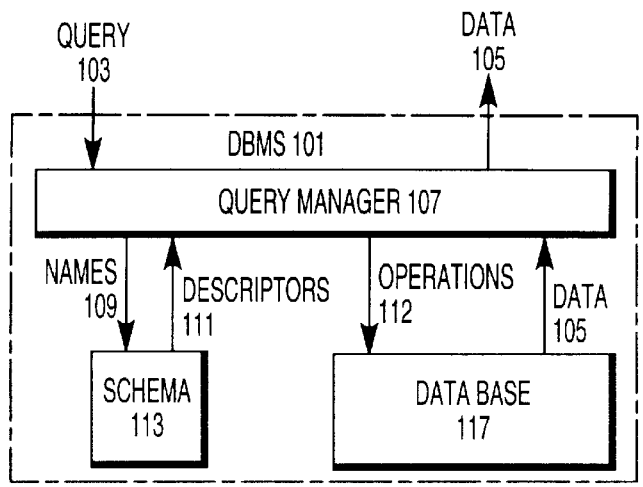
FIG. 1 is a schematic block diagram of a prior art data base management system.

Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

The following Detailed Description of a preferred embodiment will begin with an overview of the preferred embodiment and its operation and will then discuss areas of particular interest in more detail. Thereupon, the user interface for the preferred embodiment will be described in detail.

Figure 2:
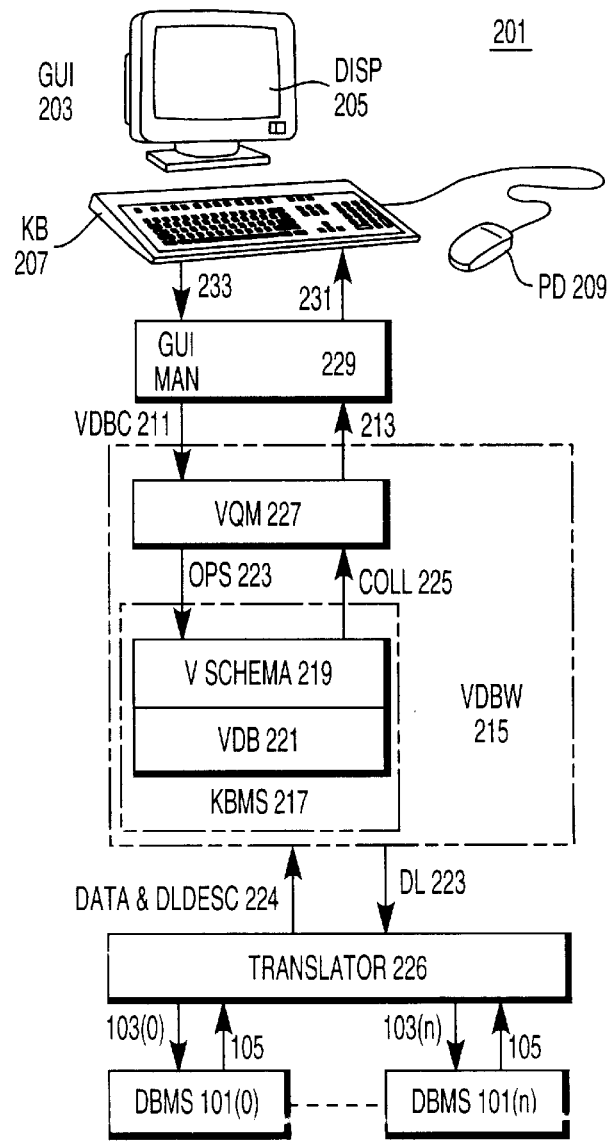
FIG. 2 is a schematic block diagram of an information retrieval system which uses a knowledge base management system in conjunction with data base management systems.

Overview of a Preferred Embodiment: FIG. 2

FIG. 2 is a block diagram of an information retrieval system 201 which employs a knowledge base management system in conjunction with one or more data base management systems 101. In essence, the knowledge base management system (KBMS) 217 is used to create a virtual data base management system (VDBMS) 215. The word virtual is used here in a sense similar to that in which it is used in the concept virtual memory system. A virtual memory system permits a programmer to address data by means of logical addresses which the system automatically translates into the physical addresses of the actual data. The programmer thus need have no notion of how the computer system on which the program is run actually stores data. A virtual data base management system similarly obtains its data from one or more data base management systems (database management systems 101(0 . . . n) in FIG. 2), but both the schema and the query language used in the virtual data base manageement system are independent of the schemas and query languages used in the data base management systems. Further, because the schema in the virtual data base management system is independent of the schemas in the data base management systems containing the data, the schema in the virtual data base management system may be specifically tailored to the domain which the virtual data base management system is being used to investigate.

The use of a knowledge base management system to create the virtual data base management system provides additional advantages:
- the schema is made using concepts pertinent to the domain being investigated, and the concepts may be used directly in the queries;
- the knowledge base system can incorporate new concepts into the schema, which thus becomes dynamically extendable; and
- changes in relationships between the concepts used in the schema and the data contained therein can be detected.

As will be explained in more detail below, these advantages make information retrieval system 201 substantially easier to use and substantially more flexible than prior-art information retrieval systems.

Continuing with the description of information retrieval system 201, in a presently-preferred embodiment, the first step in implementing information retrieval system 201 is to design a virtual schema 219 using concepts relevant to the research to be done. Once this is done, the techniques described in the Borgida, et al. patent application supra are used to load data 105 from one or more data base management systems 101 into virtual data base 221 of knowledge base management system 217. Loading is done by providing descriptions of the concepts in the schema in a description language (DL 223) used in knowledge base management system 217 to translator 226, which translates the descriptions into queries 103 as required for the relevant data base management systems 101. When the data is returned to translator 226, translator 226 provides the data, together with a description of it in description language 223 (arrow 224), to virtual data base management system 215. Knowledge base management system 217 then adds the data to virtual data base 221 as required by the descriptions. The presently-preferred embodiment of information retrieval system 201 is used in an environment in which only monthly updates of the data in virtual data base 221 are required; consequently, loading is done using a "batch" technique. In other environments in which updates must be made more frequently, loading could be done by having translator 226 retain the description language 223 descriptions, producing queries 103 from them at the required intervals, and providing the resulting data and descriptions to virtual data base management system 215. Alternatively, a user who had become aware of a relevant change in a data base management system 101 could request that the changed data be loaded into virtual data base 221.

Once virtual data base management system 215 is loaded, a user may employ graphical user interface 203 to query virtual data base management system 215 and sees the results of the queries. Graphical user interface 203 includes a display 205, upon which the information required by the user is displayed in one or more windows. The user controls graphical user interface 203 and thereby information retrieval system 201 by means of keyboard 207 and pointing device 209. Inputs from the keyboard and pointing device, indicated by arrow 233, go to graphical user interface manager 229, which generates virtual data base commands (VDBC) 211 based on the inputs. The virtual data base commands 211 are provided to virtual query manager 227. Included in the virtual data base commands 211 are conceptual queries. A conceptual query is written in a query language which is specifically adapted to knowledge base management system 217 and which expresses the query in terms of the concepts employed in virtual schema 219. The conceptual query is thus independent of any of the query languages or schemas used in the data base management systems 101 and further employs concepts which are directly relevant to the research being undertaken.

Virtual query manager 227 converts the queries into operations 223 which can be executed by knowledge base management system 217; in response to the operations, knowledge base management system 225 returns a collection 225 of information from virtual data base 221. A collection as used herein is like a set, except that the collection may contain elements which are identical. For example, {a,b,c} is a set, while {a,a,b,c} is a collection. Information 213 based on collection 225 is then returned to graphical user interface manager 229, which uses it in windows in display 205, as indicated by arrow 231. For example, graphical user interface manager 229 might use data from collection 225 to make a graph which is displayed in a window in display 205.

Figure 3:
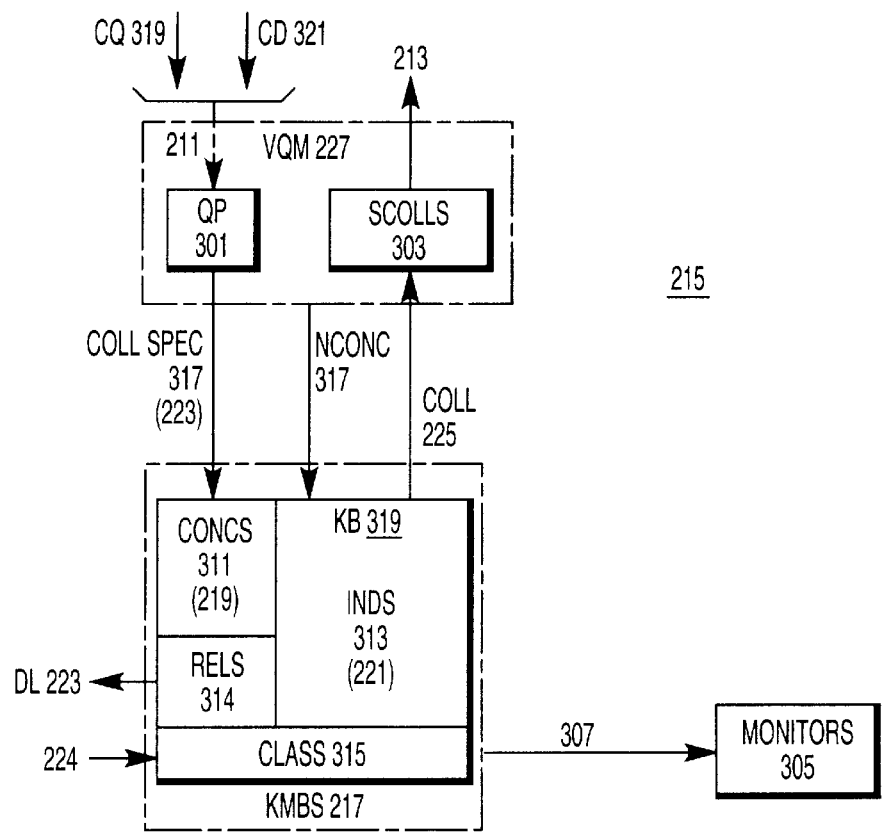
FIG. 3 is a detailed block diagram of the knowledge base management system of FIG. 2.

Details of virtual data base management system 215: FIG. 3

FIG. 3 is a detailed block diagram of virtual data base management system 215 in a preferred embodiment. Beginning with knowledge base management system 217, knowledge base management system 217 is implemented using the CLASSIC description language-based knowledge base management system. Description language-based knowledge base management systems take descriptions of concepts or of individual objects which are written in a description language and classify the concepts or the individual objects, that is, they find their relationship to all of the concepts or individual objects which are already in the data base. Classification relies on the ability of the knowledge base management system to find a generalization (or subsumption) relationship between any pair of terms expressed in the description language. Classification finds all previously-specified descriptions that are more general (i.e., that subsume) the new one, and all previously-specified descriptions that are more specifie (i.e., that are subsumed by) the new one. They can find which of the more general ones are most specific, and which of the the more specific ones are the most general, and place the new one in between those. This yields a generalization ordering among the descriptions—a partial ordering based on the subsumption relationship. The partial ordering may be thought of as a hierarchy, although most description languages permit any description to have multiple more general descriptions, and thus do not yield a strictly hierarchical ordering. Description language-based knowledge base management systems are described in R. J. Brachman and J. G. Schmolze, "An Overview of the KL-One Knowledge Representation System," *Cognitive Science*, vol. 9, No.2, Aprul–June 1985, pp. 171–216. The description language used in the CLASSIC system is described in R. J. Brachman, et al., "The Classic User's Manual, *AT&T Bell Laboratories Technical Report,* 1991.

A CLASSIC knowledge base 320 has three main parts (see FIG. 3): (1) a set of concept definitions (Concs) 311; these are the named descriptions that are stored and organized by the CLASSIC KBMS. As mentioned above, they can be either primitive or compositional; (2) a set of binary relation definitions (Rels) 314; in CLASSIC these can be "roles", which can have more than one value (e.g., child), or "attributes", which can have only a single filler (e.g., age, mother); and (3) a set of individual object descriptions (INDS) 313, which characterize individual objects in the world in terms of the concept definitions 311 and which are related together by means of the role definitions 314. With regard to the relationship between FIG. 3 and FIG. 2, individuals 313 implement virtual data base 221 and concepts 311 and relationships 314 together implement virtual schema 219.

Figure 4:
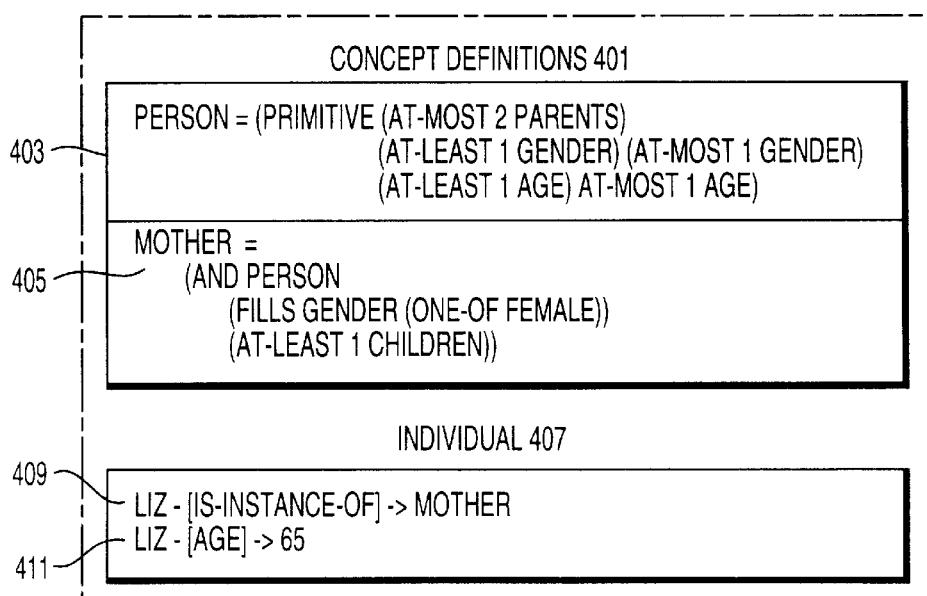
FIG. 4 shows concept definitions and individual definitions.

Examples of concepts and individual objects (hereinafter simply individuals as they are expressed in description language 223 are given in FIG. 4. In concept definitions 401, the PERSON primitive concept definition 403 says that a person is, among other things (the qualification is the meaning of the "PRIMITIVE" construct), something with at most two parents, exactly 1 gender and exactly 1 age. The MOTHER compositional concept definition 405 equates the term MOTHER with the phrase "a person whose gender is exactly 'female' and who has at least one child". In the individual portion of the knowledge base we have assertions that individuals 407 satisfy named concepts 401, i.e., LIZ 409 satisfies the previously defined concept, MOTHER; and we also have assertions of the relationships between individuals 409 in terms of roles 314 such as age 41 (not shown, since they have no structure in this embodiment), such as LIZ has age=65. Knowledge base 320 is maintained by classifier (Class) 315, which classifies descriptions as set forth above. For example, if a new individual 409 who is a mother is added to individuals 313, it is classified under the MOTHER and PERSON concepts; similarly, if a new concept, such as FATHER is added to concepts 311, it is classified with regard to the other concepts. Here, of course, it would be classified under PERSON. It should be noted at this point that the notions of individual and concept employed herein correspond to the notions of object and class employed in object-oriented systems.

The fact that virtual data base management system 215 employs a description language-based knowledge base management system such as CLASSIC gives it two important advantages over a standard data base management system. The first important advantage is that because the virtual schema 219 is implemented using concepts 311 and relations 314, it can be extended dynamically. All that is required to extend the virtual schema is to add a new concept to it. Classifier 315 is then able to integrate the new concept into the hierarchy of concepts in concepts 311. The second important advantage is that changes in the relationship between individuals 313 and concepts 311 are detectable. For example, when virtual data base 221 is updated, knowledge base management system 217 receives data and description language descriptions (arrow 224) in classifier 315, which then classifies the data as required by concepts 311; it can be determined from the classification operation whether more or fewer individuals were subsumed under a given concept than previously.

In a preferred embodiment, the fact that new concepts can be added to concepts 311 is used to make queries into concepts; that is, when a user of information retrieval system 201 defines a particularly interesting conceptual query, the collection returned by the conceptual query can be converted to a concept 403 and added to concepts 311, as shown by new concept (NCONC) arrow 317. The manner in which this is done will be described in more detail below.

In the preferred embodiment, the fact that changes in the relationship between concepts 311 and individuals 313 can be detected is used to provide a conceptual version of the triggers used in standard data base systems. A trigger is typically defined in terms of allowed values in a field; when the field is set to a value which is outside the defined limits, code associated with the trigger is executed. For example, a data base of checking accounts may have a trigger on the account balance field which causes code to be executed when the checking account balance goes below zero. Such conceptual triggers are termed herein monitors. They appear in FIG. 3 as monitors 305. Each monitor in monitors 305 defines an action to be taken if reclassification of individuals 313 results in a given kind of change in the relationship of the individuals 313 to concepts 311. Monitors 305 monitors the reclassification performed by classifier 315, as indicated by arrow 307, and if the reclassification satisfies a monitor, the action defined in the monitor is taken. For example, if the concepts 311 includes a concept WOMAN which is like MOTHER but not restricted by (AT-LEAST 1 children) then a monitor might detect movement of individuals from the concept WOMAN to the narrower concept MOTHER and define an action based on such movement.

As is apparent from the foregoing, a user at graphical user interface 203 can use virtual data base commands 211 to define concepts either directly or by specifying a collection to be converted into a concept (both possibilities appear in FIG. 3 as concept description (CD) 321), can define a conceptual query 319, and can define a monitor 305. In the case of a directly defined concept, classifier 315 simply does the reclassification necessary to add the new concept to concepts 311; in the case of a concept defined by means of a collection, query processor 301 makes a new concept 317 from the collection and provides it to classifier 315.

In the case of an input which defines a conceptual query 319, query processor 301 converts the conceptual query 319 into collection specification 318 Knowledge base management system 217 responds to collection specification 318 by performing operations which result in the return of a collection 225 to virtual query manager 227. Virtual query manager 227 retains collection 225 in saved collections 303 and uses it to produce output 213 to graphical user interface 205. Finally, a user at graphical user interface 203 may define a monitor in monitors 305. The definition includes both an action to be taken and the condition under which the action is to be taken. In the following, the techniques used to make collections into concepts and to define monitors will be described in more detail; in addition, a graphical technique for defining a query will be described.

Figure 5:
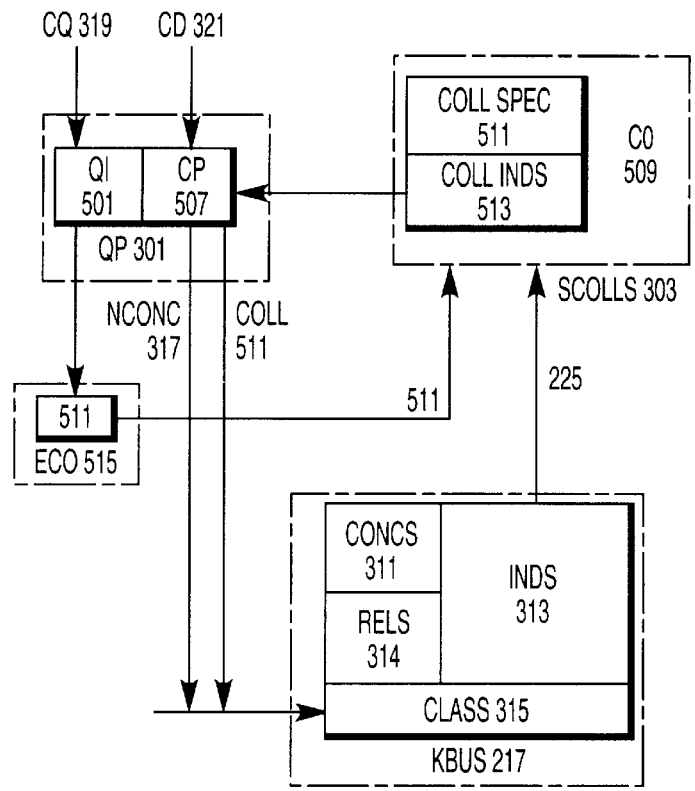
FIG. 5 is a detail of virtual query manager 227.

Details of Query Processing: FIG. 5

FIG. 5 shows in more detail how queries are processed and concepts are made from collections in a preferred embodiment. Query processor 301 has two main components: query interpreter (QI) 501, which interprets conceptual queries 309, and collection specification processor (CP) 507, which provides collection specifications 511 to knowledge base management system 217. Such collection specifications 511 are provided for two purposes: so that knowledge base management system 217 returns the collection 225 corresponding to the concept and so that a collection specification can be named and added to concepts 311 as a new concept 317. Collections 225 are represented in saved collections 303 by collection objects (CO) 509. A collection object 509 always contains a collection specification 511 which describes the collection 225 in terms which may be interpreted by classifier 315 and may also contain collection individuals 513, the actual individuals from individuals 313 which make up collection 225 represented by collection object 509.

Query processing proceeds as follows: a conceptual query 319 is defined by a user at graphical user interface 203; query interface 501 receives the conceptual query and makes an empty collection object 515 for the collection 225 specified by conceptual query 319. The empty collection object 515 contains only collection specifier 511 for the collection. Collection specifier 511 in a preferred embodiment consists of a description in description language 223 of one or more concepts in concepts 311 which contain the individuals specified in the conceptual query 319. If the collection is made up of fewer than all of the individuals included in the concepts, test functions in the collection specifier further limit the concepts so that only the individuals in the collection specified in conceptual query 319 are returned. In a preferred embodiment, the test functions are written in LISP. The test functions, which are a part of the CLASSIC knowledge base management system, are required because the language used for conceptual queries 319 is designed for ease of use in querying and is consequently more expressive than description language 223, which is designed for computational tractability in the classification operation. The algorithms used to translate a conceptual query 319 into a collection specifier 511 will be described in more detail below.

Empty collection object 515 is stored in saved collections 303. At a point in the query processing where the individuals in the collection specified by collection specifier 511 are actually required, collection processor 507 retrieves collection specifier 511 from empty collection object 515 and provides it to classifier 315. Classifier 315 classifies collection specifier 511 according to the concepts specified in the description language 223 portion of the collection description, then determines which individuals are specified by those concepts, and finally employs the test functions to select the desired individuals from the ones specified by the concepts. Those individuals make up the collection 225, which is added to the empty collection object 515 to make collection object 509, which contains not only collection specification 511, but collection individuals 513. Information from collection individuals 513 may then be used to generate displays in GUI 203, as indicated by arrow 213. Because collection specifier 511 is unnamed, it does not become a permanent part of concepts 311.

If a user of information retrieval system 201 finds a collection 225 to be particularly useful for analysis purposes, the user can make the collection specification 511 for the collection into a permanent part of concepts 311. To do this, the user provides a concept definition 321 at graphical interface 203. The concept definition includes a name for the concept and a specifier for the collection. If the collection has already been specified by a query and has a collection object 509 in saved collections 303, the concept definition need only specify the collection object; otherwise, it must specify a conceptual query 319. In the former case, collection processor 507 simply retrieves collection specification 511 from the specified collection object 509, associates specification 511 with the name, and provides the name and the specification as new concept 317 to classifier 315, which classifies it and adds it permanently to concepts 311. In the case where concept definition 321 specifies the concept by means of a conceptual query 319, collection processor 507 provides the query to query interpreter 501, which produces empty collection object 515 containing collection specification 511 corresponding to the query. The name for the concept is then associated with collection specification 511 and the collection specification added to to concepts 311 as just described.

Details of Query Interpreter 501

Query interpreter 501 translates a conceptual query into a CLASSIC description language expression. The translation will be illustrated in the following for several simple cases.

The following example assumes a simple domain model for which we have defined the concept PERSON and the attributes NAME and AGE. The most common conceptual queries are of a form that selects a subset of a collection, yielding another collection as its result; the idiom for this type of query is

```
<var> IN <collection>
    WHERE <boolean-expression>
``` where IN and WHERE are keywords, <var> specifies a variable, <collection> a collection, and <boolean-expression> an expression used to select individuals from the collection to be bound to the variable. Conceptually, this query will iterate over the elements of <collection>, successively binding <var> to each element and evaluating <boolean-expression> in terms of that binding (i.e. the <boolean-expression> is usually in terms of <var>). For example, we might issue a query that selects a collection of those persons named Bob:

```
x IN person
    WHERE x.name = Bob
```

This query can be expressed completely within the CLASSIC description language, so the collection produced as the result of this query is represented as an unnamed concept with the following CLASSIC expression:

```
(and person
    (fills name Bob))
```

When the elements of this collection are requested, the concept expression is parsed and normalized to create an unnamed temporary concept in the knowledge base. The elements of the collection are the extent of this unclassified concept. By giving the collection a name (say, collection-1), we can refer to this collection in subsequent queries. For example, we might wish to find those Bobs over the age of 20:

```
x IN collection-1
    WHERE x.age >= 20
``` becomes the unclassified concept

```
(and person
    (fills name Bob)
    (min age 20))
```

One can take the naming of a collection a step further by explicitly placing it in the concept hierarchy as a classified concept. The following query language statement creates a concept described by collection-1:

DEFINE_CONCEPT persons-named-bob WITH collection-1

This creates the classified concept persons-named-bob, which is stored in the Classic concept hierarchy like any other named concept.

Since the query language is more expressive than the CLASSIC description language, complete translation of a query language expression into CLASSIC expression is impossible. In this case, the portions of the query inexpressible in the CLASSIC description language are translated into executable Common Lisp code, which is embodied in a Classic test function. Even in the cases where the translation must fall back on the use of test-functions, the collection can still be restricted to the most specific parent in the concept hierarchy, restricting the number of knowledge base individuals upon which the test function must be run. For example, suppose we had asked for all persons who have working for more than half their lives:

```
x IN person
    WHERE x.years-on-job/x.age > 0.5
```

In this case, the concept representing this collection is defined with the help of a Classic test function:

```
(and person
    (test-c '(lambda (x)
        (> (/ (filler x 'years-on-job)
              (filler x 'age))
           0.5))))
```

The foregoing translations are implemented using techniques well-known in the compiler and interpreter arts. The tokens of the conceptual query are lexed, the meanings of concepts, roles, and attributes are obtained from concepts 311 and relationships 314, and then the description language statements and test functions which will generate the collection specified by the conceptual query are generated.

Figure 9:
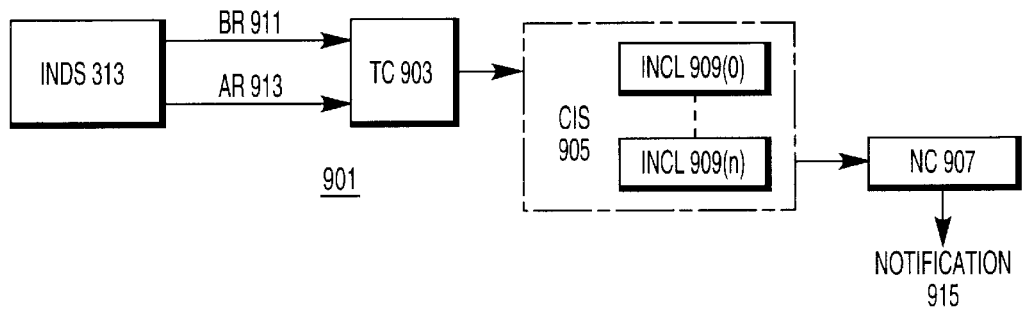
FIG. 9 shows a monitor.

Details of Monitors 305: FIG. 9

As previously mentioned, monitors 305 monitor changes which occur in knowledge base 320 and performs actions based on those changes. For example, suppose that the concept Customer is divided into the sub-concepts High-Spenders, Medium-Spenders, and Low-Spenders. And suppose that the definitions of High-Spenders, Medium-Spenders, and Low-Spenders are as follows (these are informal definitions):

High-Spenders: Customers who average more than $100 in monthly spending

Medium-Spenders: Customers who average more than $20 but less than $100 in monthly spending Low-Spenders: Customers who average less than $20 in monthly spending Suppose that for the first six months of the year, the customer Joe Smith spent a total of $300. Consequently, after six months, he would be classified as a Medium-Spender. If, however, he were to make a $470 purchase in the seventh month, his monthly average would go up to $110, and he would be automatically reclassified as a High-Spender.

In a data analysis application, it is particularly useful not just for individuals to be reclassified, but for an analyst to be able to keep track of changes in the classification of individuals over time. That is, the analyst might want to know which customers have just become High-Spenders, perhaps in order to add them to a certain mailing list. In the current preferred embodiment, updates are applied to the knowledge base 320 once a month. Information management system 201 permits analysts to specify which changes the system should monitor for during the monthly update. If these changes occur, the analyst is notified. Examples of changes the analyst could request to be monitored include:

Whenever a customer becomes a High-Spender, I want to be notified.

Whenever the number of Low-Spenders increases by 10%, I want to be notified.

Monitor all migrations of customers among the concepts High-Spenders, Medium-Spenders, and Low-Spenders.

Then, when the knowledge base 320 is updated and individuals 313 are reclassified, IMACS checks to see whether any of these monitoring conditions are satisfied. If so, the analyst is notified. The graphical user interface for defining monitors 901 and receiving notifications is described in the discussion of the user interface below.

FIG. 9 presents the detailed structure of a monitor 901 in monitors 305. Monitor 901 consists of three major parts:

code for a condition to monitor for (Triggering Condition 903), a collection of the individuals (IND) 909 (0 . . . n) that satisfy the monitored condition (Collected Individuals 905), and code for conditions under which to notify the analyst (Notification Conditions 907).

The triggering condition 903 for a monitor could be an arbitrary function. However, we have found a restricted set of conditions to be particularly useful, and we list these for the sake of illustration:

a change FROM one concept TO another (TRANSITION) example: FROM High-Spenders TO Low-Spenders a change FROM one concept (OUT MIGRATION) example: FROM High-Spenders a change TO a concept (IN MIGRATION) example: TO Low-Spenders The collected individuals 905 simply is a collection of individuals 909 that (during a particular monthly update to the knowledge base 320) satisfy the triggering condition 903. Like other collections in information retrieval system 201, collected individuals 905 is a first-class object.

After an update to the knowledge base is completed, all the monitors 901 are examined to determine whether the notification conditions 907 are satisfied. If so, the analyst is notified, as indicated by arrow 915. Two types of criteria that we have found useful are:

specified NUMBER of individuals changed examples: 10 individuals changed FROM High-Spenders to Low-Spenders 5 individuals changed TO Low-Spenders a specified percentage of individuals changed examples: 10% of all High-Spenders became Low-Spenders The number of Low-Spenders increased by 20%

We now can state the monitoring algorithm very simply.

1. While applying updates to the knowledge base 320 do
    (a) For each individual I that is updated do
        i. Record the concept(s) OLDP to which I currently belongs (arrow before reclassification (BR) 911);
        ii. Reclassify the individual I
        iii. Record the concept(s) NEWP to which I now belongs (arrow after reclassification (AR) 913)
        iv. Monitor-Change (I, OLDP, NEWP) (see details below).
2. After applying all updates to the knowledge base 320 do
    (a) For each monitor 901 M do
        i. If the notification conditions 907 are satisfied, then notify the analyst that the collected individuals 905 changed as specified by the triggering condition 903.

The algorithm for Monitor-Change (I, OLDP, NEWP) is as follows:

1. For every monitor 901 M do
2. If the transition from OLDP to NEWP satisfies the triggering condition 903, then add the individual I to the collected individuals 905 of that monitor.

Interactions of Users with Information Retrieval System 201

Figure 6:
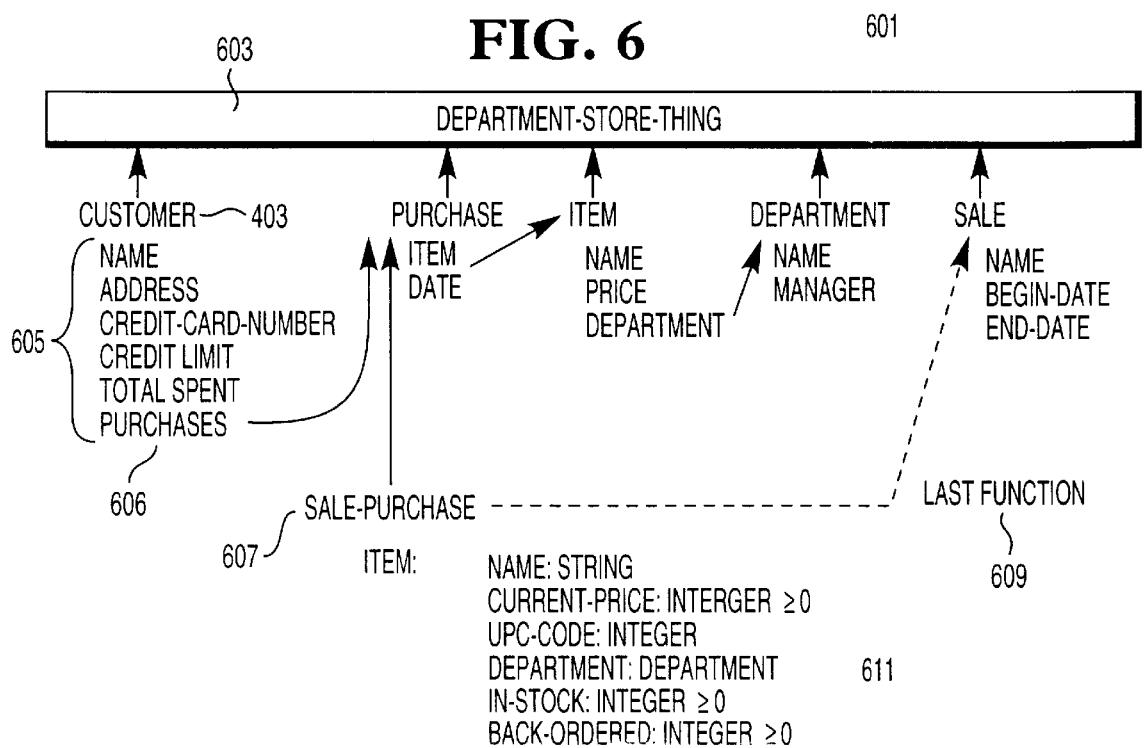
FIG. 6 is a diagram of an example domain model.

As previously indicated, a user of information retrieval system 201 interacts with system 201 by means of graphical user interface 203. The following discussion will explain that interaction in some detail. The discussion will use an example in which information retrieval system 201 is used to perform research on the behavior of a department store's customers. Virtual schema 219 in the example is made up of the concepts, roles, and attributes of a department store domain model. FIG. 6 shows this domain model 601. At the top of the hierarchy formed by the domain model is DEPARTMENT-STORE-THING 603, a concept that functions simply as the root of the hierarchy. The concepts 403 PURCHASE, ITEM, DEPARTMENT, and SALE are all subsumed directly under DEPARTMENT-STORE-THING and SALE-PURCHASE 607 is subsumed under PURCHASE, as shown by the broad arrows. Some of the concepts have roles which relate them to other concepts. A role is indicated by a narrow arrow which relates the role to the other concept. For example, consider CUSTOMER. CLASSIC specifies that role 606 purchases must be filled by individuals belonging to the PURCHASE concept. The remainder of the list associated with CUSTOMER specifies attributes. Attributes 605 indicate information about individuals belonging to the concept which is not related to other concepts. As previously mentioned, test functions can be associated with a concept to define properties of the concept that cannot be expressed in the CLASSIC description language 223. In this domain model, the definition of SALE-PURCHASE uses a test function 609 that examines the date of a purchase to see if the purchase occurred during a sale.

Internally, a concept is defined by means of a data structure like that shown at 611 for ITEM. The concept's name is defined by a string in the name field, the department role is defined in the department field, and the remainder of the fields define attributes and specify limits on the values which the attributes may have.

When a user of information retrieval system analyzes the data available to the system, the analysis involves four tasks:
- viewing data in different ways, including concept definitions, aggregate properties of concepts, tables of individuals, and graphs;
- segmenting data into subsets of analytic interest;
- defining new CLASSIC concepts from a segmentation;
- monitoring changes in the size and makeup of concepts that result from incremental updates from the databases.

The remainder of this section will illustrate how the interface supports each of the tasks with usage scenarios from the department store domain and will show how the interface combines power and ease of use, supports the practical interaction of the users' tasks, and supports the users in managing their work over time.

Viewing Data

An analyst views data first, to "get a feel for the data", e.g, to determine the attributes that characterize a customer, the average amount customers spend, or the amount spent by particular customers, and second, to formulate questions to be investigated, e.g. "Is there any correlation between the percentage of purchases customers make during sales and the total amount they spend?"

A necessary part of analyzing data is selecting characteristics of the data to view. For example, an analyst might want to see a table of customers which showed the total amount spent, the number of purchases made, and the percentage of purchases that were made during sales. Such a table is termed a view of the data. In order for a data base management system to be useful, the system must be able to provide views which combine data from many of the underlying tables. The views may be tables, or they may employ other display techniques. For example, to determine the percentage of purchases a customer made during sales would involve accessing the value of the purchases role for the customer, determining which purchases were SALE-PURCHASEs, then dividing the number of sale purchases by the total number of purchases.

Figure 7:
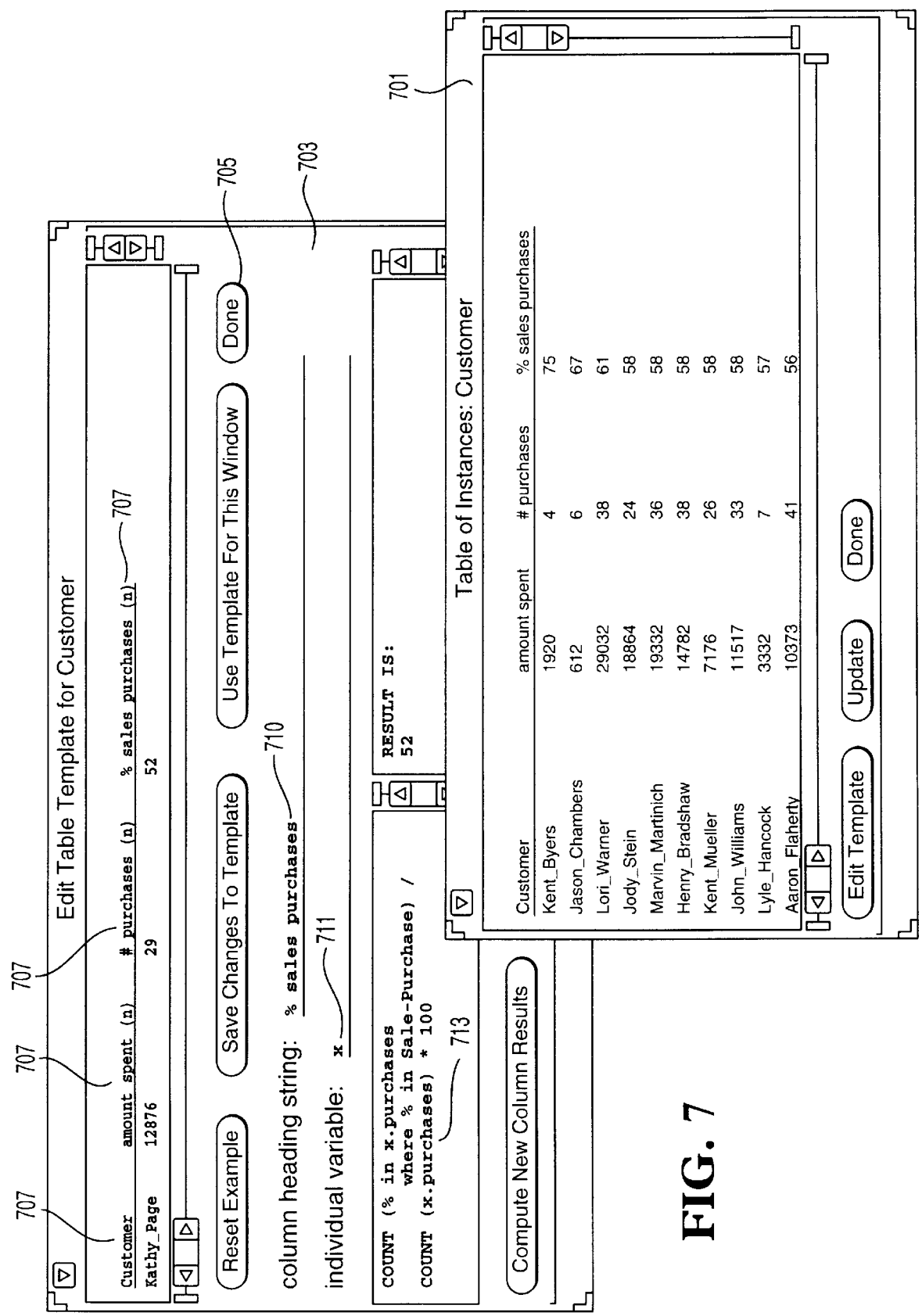
FIG. 7 shows a table template and a table.

These considerations led to a decision that all views should be driven from templates, declarative specifications of the data to be displayed, and that all such templates should be user-editable. FIG. 7 shows a template 703 and a table view 701 corresponding to the template 703. (While the use of templates is shown for table views, they may be used for other kinds of views as well). Each template 703 for a table view consists of a set of column headings 707 which define the columns to be displayed in table view 701 and a conceptual query language expression 713 which defines what is to be displayed in the column specified at 710. Field 711, finally, defines the variable to be used in conceptual query language expression 713. Control of template 703 is by means of buttons 705.

Use of templates 703 is as follows: when a domain model 601 is created, a set of templates is made which provides basic views of the data in the domain for domain model 601. Analysts then use these templates to construct other templates as required for their work. Particularly useful templates 703 may be saved for use by others. For example, template 703 originally specified a view which indicated for each customer the amount spent and the number of purchases. When the analyst selected the original template, a table corresponding to the original template was displayed. The analyst using the original template decided, however, that he wanted to see what percentage of those purchases for each customer where made at sales. To see that, the analyst edited the orignal template. He began the editing operation by pushing the "edit template" button in table 701. In the editing operation, he added the column % sales purchases and specified conceptual query expression 713 for that column:

```
COUNT (z in <x>.purchases
    where z in SALE-PURCHASE)/
COUNT (<x>.purchases)*100
```

Query expression 713 finds the number of purchases for each customer and the number of sales purchases, divides the number of sales purchases by the number of purchases, and then multiplies by 100 to achieve the desired percentage.

When the analyst was done editing template 703, he selected "Done" 705 button to indicate that fact and selected the "use template for this window" button to generate view 701 corresponding to the edited template 703. If the analyst finds the edited template useful, the analyst can select the "Save changes to template" button to save the changes and thereby to produce a new template 703 which is available to others for use and further editing. If the edited template is not useful, the "Reset Example" button permits the analyst to get back to the original template. In the above example, the template only involves a single level of the concept hierarchy. Where more than one level is involved, templates are inherited down the concept hierarchy and are composed to determine the complete view for a particular table: if the analyst asks to see a table of the instances of CUSTOMER, and CUSTOMER is a specialization of PERSON, the templates for both PERSON and CUSTOMER would be used to construct the table.

Note that the template-based scheme does not require extra work of an analyst: for all but the simplest views, the analyst must select certain characteristics of the data to view. And the work of creating a template benefits both its creator and other analysts in the future. As mentioned, one of the shortcomings of current tools for data analysis is that they do not support management of work over time. In other words, the work of viewing and segmenting data that is done as part of one analysis is not available for use in another analysis. The template-based view scheme also affords important opportunities for division of labor and cooperation with other analysts. First, while at least one analyst working in a particular domain must be familiar with the template editing tool and the conceptual query language to create appropriate templates, other analysts can use these templates once they are constructed. Second, when another analysts need to view data somewhat different than existing templates provide, their task is to edit an existing template, rather than create one from scratch. Since only a small part of the complete conceptual query language expression is required for the edit, a far lower skill level at composing conceptual query language expressions is required. The templates thus serve as a point of cognitive contact among users that encourages natural division of labor and task-centered, as-needed learning.

Figure 8:
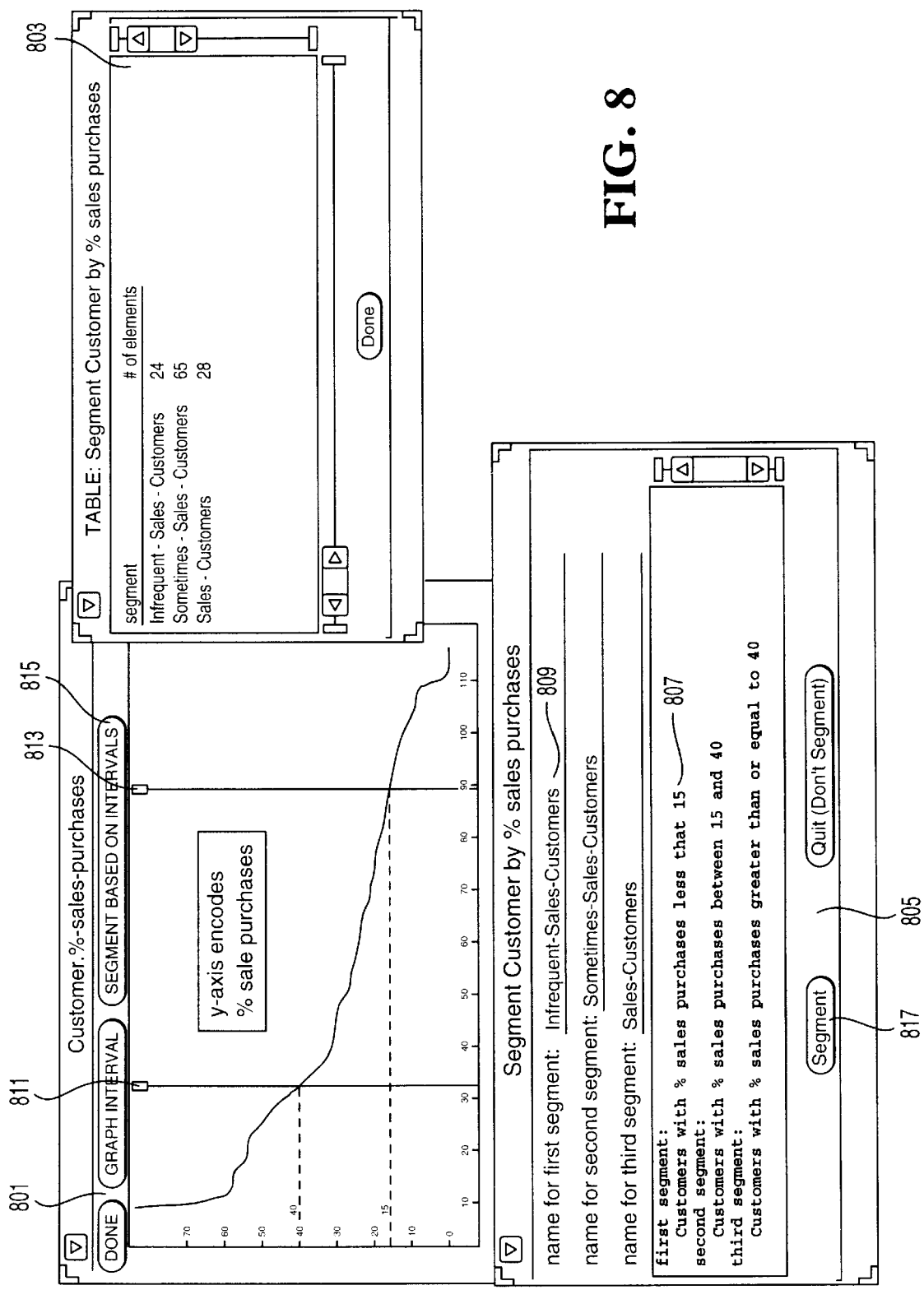
FIG. 8 shows segmentation using a graph.

In addition to seeing a view as a table, an analyst can see the view as various types of graphs and plots, for example, a plot of the individuals in a table based on the values in a particular column of the table. FIG. 8 shows a plot 801 of customers based on percent of sale purchases. All of the customers are listed on the x axis in order of decreasing percent of sale purchases and the y axis shows the percent of sale purchases for each customer.

Segmentation of Data

The purpose of segmenting data is to create subsets of analytic interest, e.g., customers who buy mostly during sales, or high spending customers, or customers with high credit limits. The presumption is that useful generalizations can be made about such subsets, e.g., that they may respond well to certain sales or are more likely to get behind in their payments. Viewing and segmenting are interwoven tasks: viewing data initially suggests hypotheses and questions, segmenting the data puts these hypotheses into a testable form (by forming categories over which the hypotheses may or may not hold), then further viewing of the segments tests the hypotheses. It is fundamental to the flexibility of information retrieval system 201 that all collections are first-class objects. That is, the same operations can be performed on a collection produced by a further segmentation of a given collection that could be performed on the given collection. For example, if a first segmentation reveals further interesting properties, a second segmentation may be made of the first segmentation.

Information retrieval system 201 provides 3 ways to segment data: with conceptual queries, with forms (abstracted from queries), and from graphs. Each method has its advantages. The power of a general-purpose query language is necessary since it is impossible to anticipate every way that analysts will want to segment data. On the other hand, it is possible to recognize routine segmentation methods in a domain, and this is where forms come in.

Figure 13:
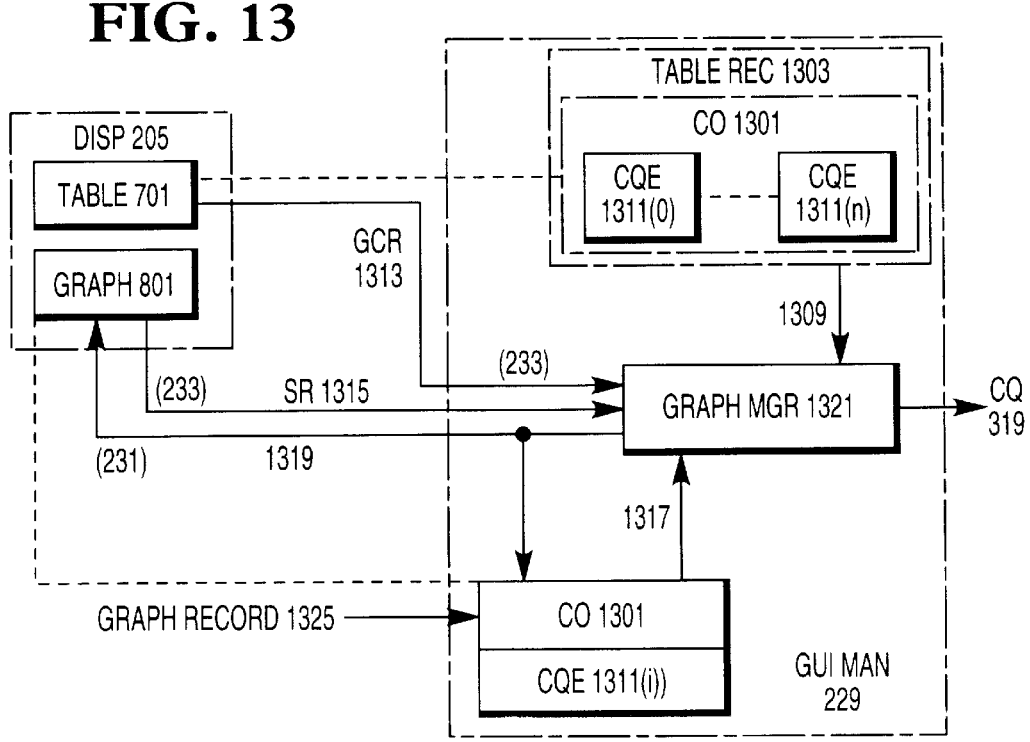
FIG. 13 is a diagram showing how a query is derived from a graph.

Segmentation using Graphs: FIGS. 8 and 13

Graphs afford natural opportunities for segmenting data as breaks in a graph suggest segment boundaries. Two such breaks appear in graph 801 The analyst can indicate segmentation points in a graph with a mouse click; vertical lines 811 and 813 show the segmentation points, and the horizontal dotted lines show the boundary elements from the data vector. Thus, graph 801 indicates a segmentation of CUSTOMERs into those with percent of sale purchases greater than 40, between 15 and 40, and less than 15. Selecting the "Segment Based on Intervals" button 815 causes information retrieval system 201 to generate queries which will result in the desired segmentation and brings up a menu 805 that presents English paraphrases 807 of the queries that will be generated to segment the data and has fields 809 which the analyst can use to name the segments. To actually perform the segmentation, the analyst selects segment button 817.

It is possible to segment from a graph of a column from a table of individuals because the column was defined by a conceptual query language expression. In the example we have been considering, the column "% sale purchases" was defined by the expression:

```
COUNT (z in <x>.purchases
    where z in SALE-PURCHASE)/
COUNT (<x>.purchases)*100
```

From this conceptual query language expression and from the segmentation points indicated by the analyst, queries to segment CUSTOMERs into those with percent of sale purchases greater than 40, between 15 and 40, and less than 15 are generated automatically. For example, the query that defines the second segment is:

```
x in CUSTOMER where
(COUNT (z in <x>.purchases
    where z in SALE-PURCHASE)/
COUNT (<x>.purchases)*100) 3 15 AND
(COUNT (z in <x>.purchases
    where z in SALE-PURCHASE)/
COUNT (<x>.purchases)*100) < 40
```

When the segmentation is done, table 803 appears, which lists the segments in the order in which they appear in the graph and the number of customers in each segment.

The above technique depends on a feature of the user interface: for each graph, table, or the like which graphical user interface manager 229 displays in display 205, manager 229 maintains an associated data structure. Thus, as shown in FIG. 13, manager 229 maintains table record 1303 corresponding to table 701 in display 205 and graph record 1325 corresponding to graph 801. The associations are indicated in FIG. 13 by dashed lines.

One of the primary purposes of this record is to enable the graphical displays to be "live", i.e., for a user to be able to get more information about the numbers, graphics, etc. For that reason, each associated record contains a collection object 1301 specifying the collection from which the table or graph is generated and the conceptual query expressions 1311 used to generate the graph or table. Thus, table record 1303 records (among other things):

The collection object 1301 which defines the collection from which information about individuals is being displayed; and for each column in the table, the query language expression 1311 that defined the data in this column.

So, table record 1303 for table 701 described above would include the following information:

```
Table-Record 1303
Collection Object 1301-Customer
QLE 1311(0)-
x.amount-spent
QLE 1311(1)-
COUNT (x.purchases)
QLE 1311(2)-
COUNT (z in x.purchases where
z in Sale-Purchase)/
COUNT (x.purchases)*100
```

Users can perform many operations on the data displayed in a table, including examining all the data for a particular individual and sorting the table based on a particular column. What is relevant here is that users also may request a graph of the data in a particular column, like "% sale purchases". (Note: in order to graph the data in a column, the data must be numeric, and must be sorted). FIG. 8 shows graph 801 for the "% sale purchases" column of Customers. To make the graph, graph manager 1321 proceeds as follows: the user selects a column from table 701, as indicated by the graph column request (GCR) arrow 1313. Graph manager 1321 responds to the selection by reading the conceptual query expression 1311(i) for the relevant column from table record 1303 for table 701 (arrow 1304), using the conceptual query expression 1311(i) to obtain the relevant information from the individuals in the collection specified by collection object 1301 in table record 1303, and then making graph 801 and graph record 1325. Graph record 1325 contains (among other things) conceptual query expression 1311(i) and collection object 1301 from table record 1303.

For example, the graph record for the graph in FIG. 8 would include the following information:

```
-Collection object 1301-Customer
-QLE 1311-
COUNT (z in x.purchases where
z in Sale-Purchase.)/
COUNT (x.purchases)*100
```

How does the system generate the queries from the graph? In response to a segmentation request 1315 from the user, graph manager 1321 reads graph record 1325, which shows that 1. the collection to be segmented was Customer
2. and the query language expression 1311 that generated the data values was

```
COUNT (z in x.purchases where
z in Sale-Purchase)/
COUNT (x.purchases)*100
```

The segment request 1315 further indicated that the lower bound for the segment "sale customers" was 40.

Using the specification of the collection in collection object 1301, the query language expression 1311(i) that generated the data values, and segmentation request 1315, as indicated by arrows 1315 and 1317, the system generates the following conceptual query 319:

```
C in Customer
    where ( COUNT (z in C.purchases where
    z in Sale-Purchase)/
        COUNT (C.purchases)*100 )
    >= 40
``` where C is a system-generated variable name and Customer is understood to be the collection specified in collection object 1301. Of course, as pointed out earlier, in a preferred embodiment, the collection is specified using description language 223. Note that all occurrences of the free variable "x" in the query language expression 1311 (which ranged over individuals in the table) were replaced by the new variable name "C".

In general, suppose the system needs to construct a query for the set S, the query language expression QLE, and user-specified lower bound LB, and upper-bound UB. The query will be of the form:

```
VAR in S
    where QLE(VAR) >= LB AND
    QLE(VAR) < UB
``` where VAR is a system generated variable name, S specifies a collection, and the notation QLE(VAR) means that the free variable in QLE has been replaced by VAR.

While we have shown only how to construct queries from graphs of a single column from a table (i.e., defined by a single query language expression), this scheme generalizes to graphs that show multiple columns. For example, suppose we have a two dimensional graph where the x coordinate plots data from column C-1 of a table (defined by QLE-1), and the y coordinate plots data from column C-2 of a table (defined by QLE-2). Then the user could indicate a segment by specifying a rectangle on the graph. If the rectangle was defined by the x coordinates X-MAX and X-MIN and the y coordinates Y-MAX and Y-MIN, the query that the system would generate would be

```
VAR in S
    where QLE-1(VAR) >= X-MIN AND
    QLE-1(VAR) < X-MAX and
    QLE-2(VAR) >= Y-MIN and
    QLE-2(VAR) < Y-MAX and
```

It should further be pointed out that the foregoing technique is by no means limited in its application to virtual data base management systems, but can be applied in standard data base management systems as well.

Figure 10:
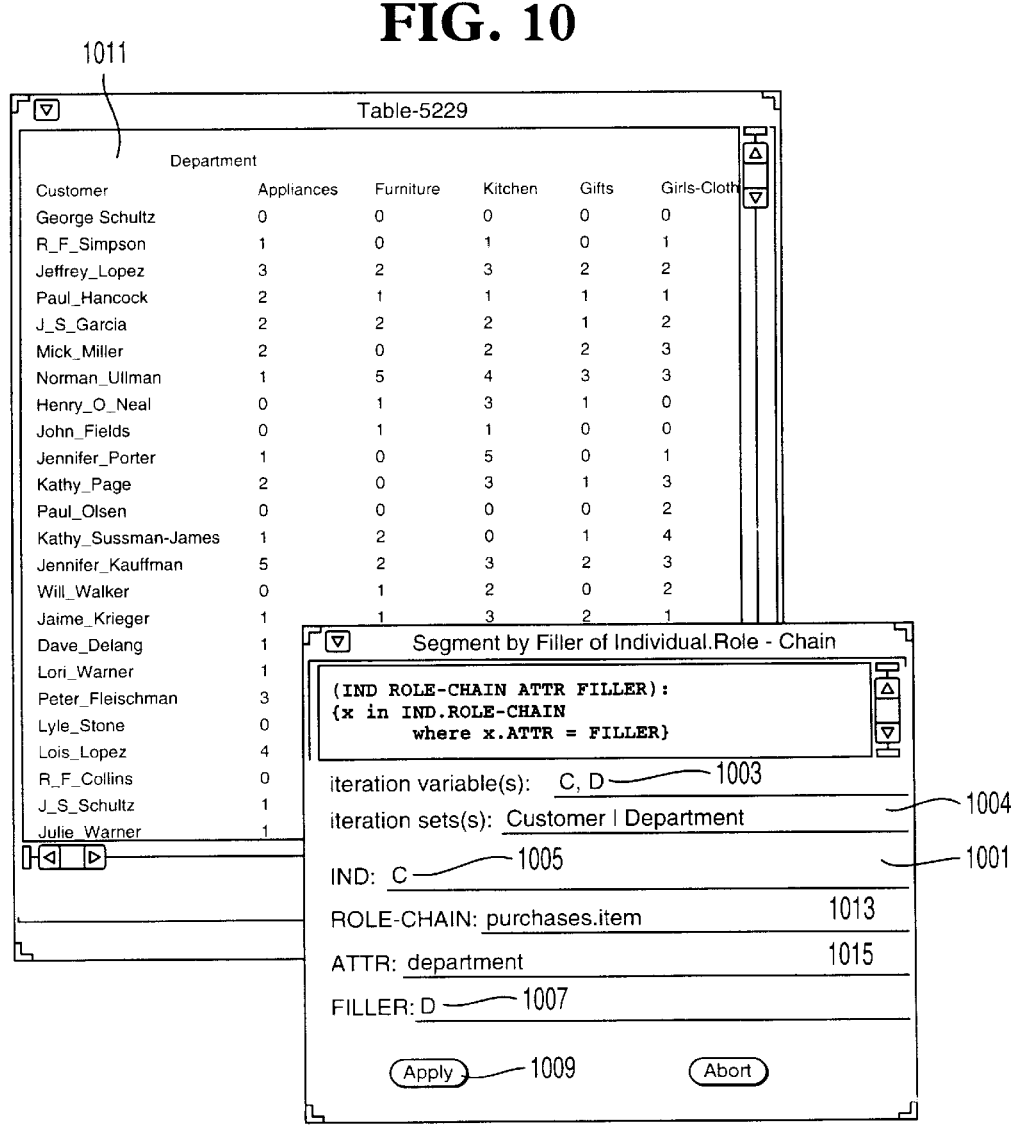
FIG. 10 shows a form.

Segmentation using Forms: FIG. 10

Forms capture the most common queries employed in a domain, e.g., segmenting the instances of a concept by the amount of change in a vector attribute (like purchase history) of each instance. The most important aspect of these forms is that they are all derived from queries in the query language by replacing parts of the queries by variables. Forms may be defined in two ways: when a particular data retrieval application is designed, the most common queries are made into forms and saved in a library that is loaded at system start-up time; however, if analysts need to construct an ad-hoc query in the query language that they then realize is generally useful, a simple "abstraction" window guides them through the process of creating a form from the query. The observations made about view templates as reusable resources and media for cooperation apply to forms as well.

FIG. 10 shows a form 1001 being filled out that will segment customers' purchases by the department of the item purchased; the resulting table 1011 might lead the analyst to look for correlations among departments in which customers make their purchases. In form 1001, the analyst specifies iteration over all DEPARTMENTs and CUSTOMERs in field 1004; in field 1003, the analyst specifies the variables which will represent the DEPARTMENTS and CUSTOMERS in the queries generated from the form; as set out at fields 1005 and 1007, the independent variable is C, standing for CUSTOMERS and the dependent variable is D. The connection between CUSTOMER and DEPARTMENT is specified by fields 1013 and 1015; field 1013 specifies the chain of roles that relates the two: the role purchases in CUSTOMER refers to the concept PURCHASE, which in turn has the role item which refers to the concept ITEM. Within the concept ITEM, the concept DEPARTMENT is referred to by the role department, as set forth in field 1015. When "apply" button 1009 is specified, query processor 301 generates one query for each possible pairing of DEPARTMENT and CUSTOMER individuals. A typical query would be:

x in Joe-Smith.purchases.item where
x.department=Appliances

Figure 14:
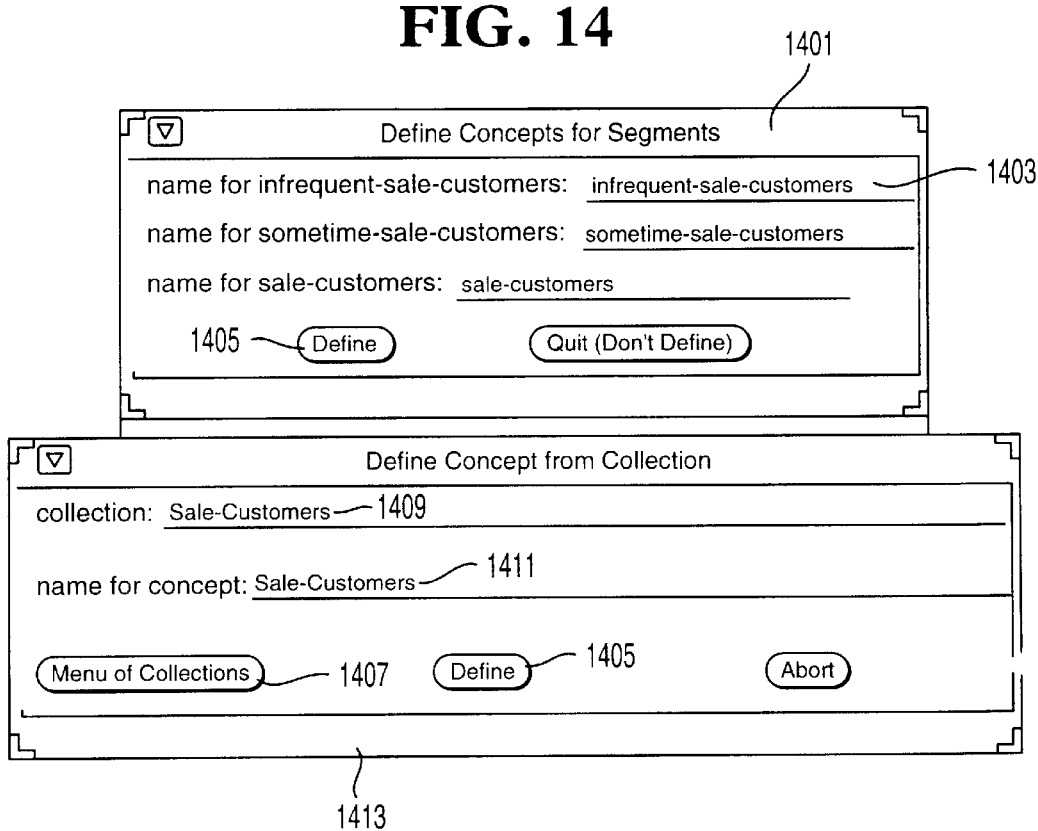
FIG. 14 shows the windows used to define concepts from collections.

Defining Concepts: FIG. 14

FIG. 14 shows the windows used in a preferred embodiment of information retrieval system 201 to define a concept from a collection. There are two techniques: defining segmentations as concepts, and defining collections as concepts. Window 1401 shows how segmentations are defined as concepts. As shown in FIG. 8, screen 805 permits an analyst to give the segments of a collection names 809. When the analyst selects the "Define" button of section 1107 of the Analysis Work Area of FIG. 11 after having named the segments, screen 1401 appears. By entering names in field 1403, the analyst can specify the names for the concepts 311 corresponding to the segments. Once the names have been entered, the analyst can name the concepts by pushing the "Define" button 1405.

Window 1413 shows how the analyst can define a concept from a collection. As indicated by button 1407, system 201 maintains a menu of collections. When the analyst selects button 1407 and then selects a collection from the menu displayed in response to button 1407, the name of the collection appears in field 1409. The analyst can then name the concept corresponding to the collection by typing the name for the concept in field 1411 and selecting "Define" button 1405.

Figure 15:
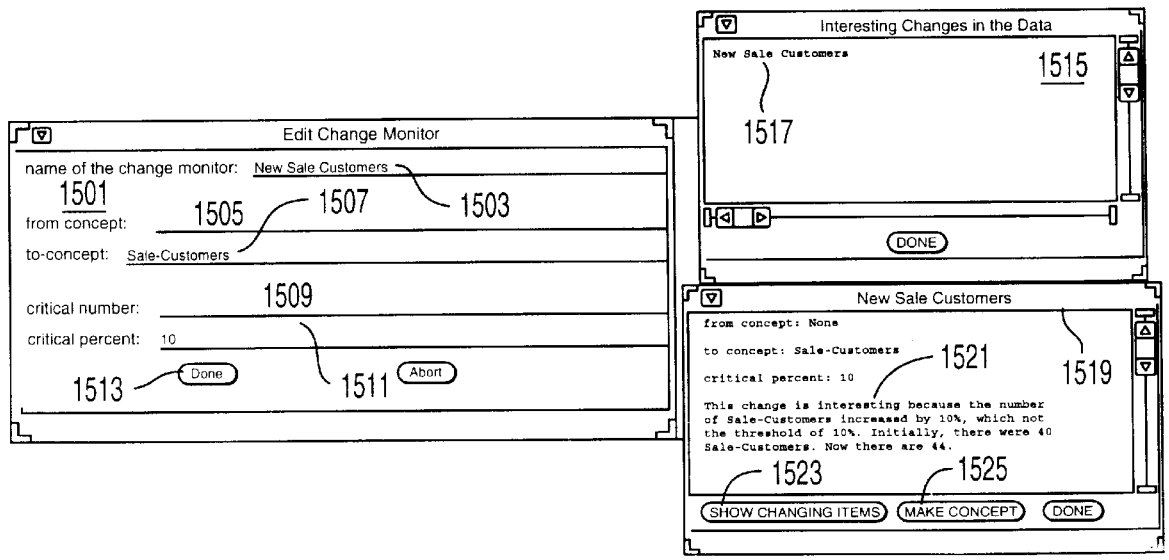
FIG. 15 shows the windows used with monitors.

Defining Monitors: FIG. 15

FIG. 15 shows the windows used to define monitors 901 and observe the changes reported by the monitors. Window 1501 is used to define a monitor. The input to field 1503 gives the monitor a name; the inputs to fields 1505 and 1507 define the type of the monitor and the concepts to which it applies. In this case, the monitor reacts to individuals coming into the concept Sale-Customers. In a preferred embodiment, monitors 901 will notify the analyst whenever either a critical number or critical percentage of changes is reached; which it is to do, and what the number or percentage is to be is defined in fields 1509 and 1511. Selecting button 1513 creates the monitor 901 defined by the fields and adds it to monitors 305.

After the data in individuals 313 has been updated, window 1515 displays a list of monitors 901 for which there have been changes requiring notification. As indicated by 1517, the monitors are listed by name. To view the changes, the user selects one of the names in window 1515. Thereupon, window 1519 for the selected monitor appears. The window describes the monitor 901 to which it corresponds and includes a comment 1521 indicating why the change is interesting. If the analyst wishes to investigate further, she can select button 1523 to see the individuals in CIS 905. The analyst can further convert the collection to a concept by selecting make concept button 1525.

Figure 11:
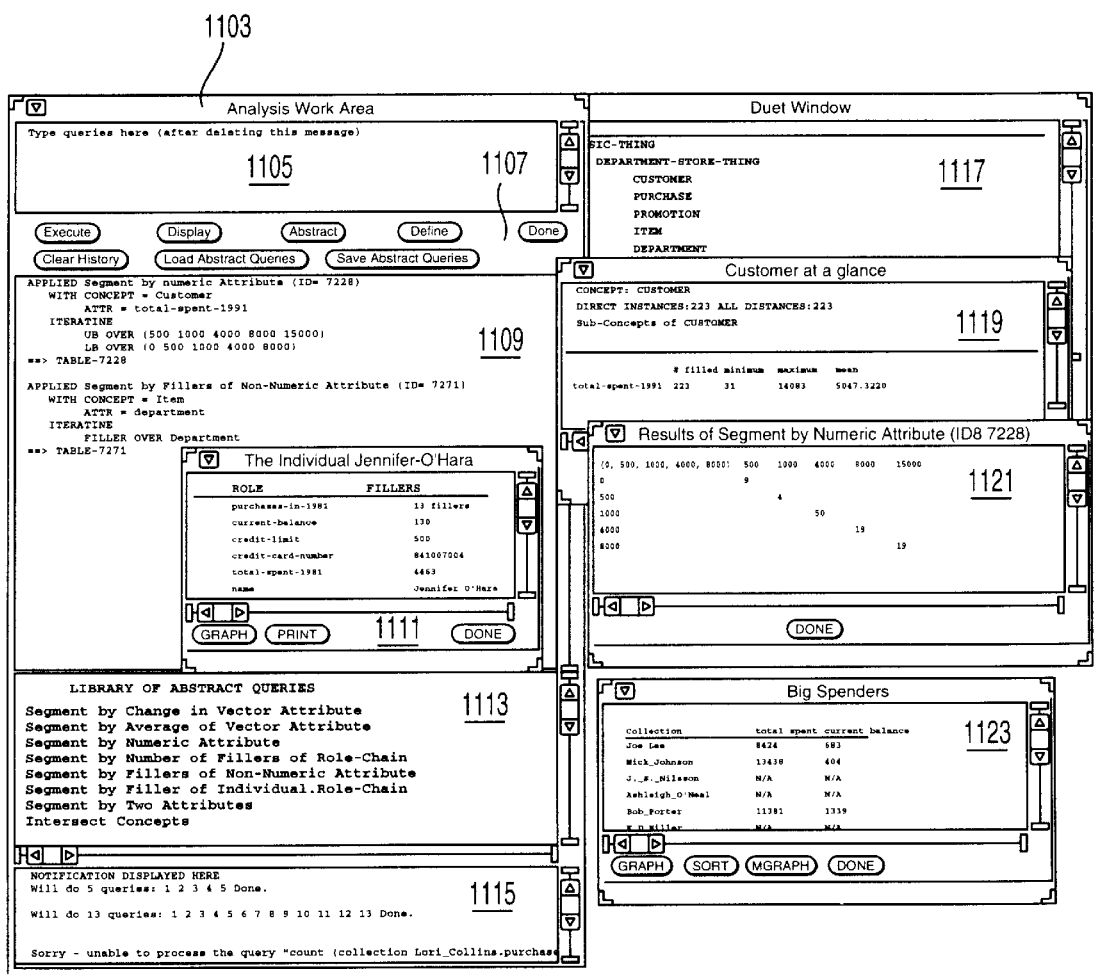
FIG. 11 shows a set of windows used in the system of FIG. 2.
Figure 12:
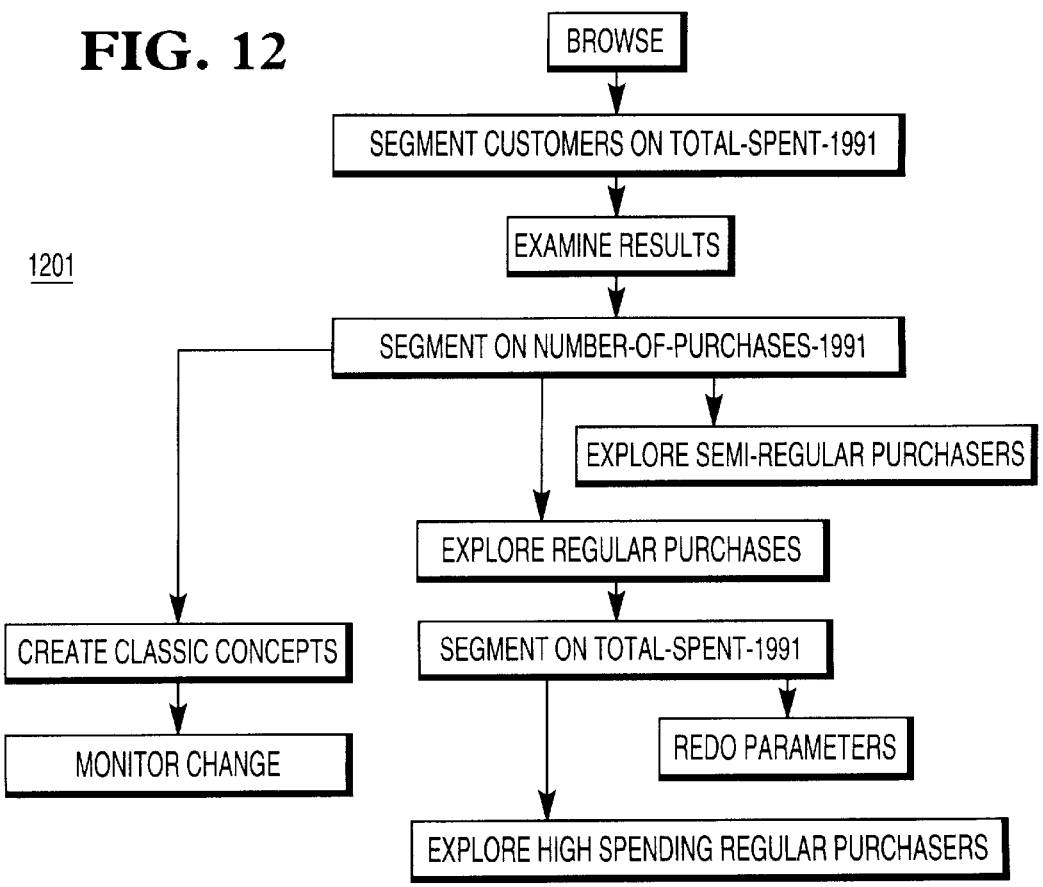
FIG. 12 is a diagram of user interaction with the system of FIG. 2.

Operation of the User Interface: FIGS. 11 and 12

Consider a data analyst who is interested in exploring the general buying patterns of customers. The analyst wants to determine whether customers can be grouped into categories such as "regular", "semi-regular", and "infrequent", which are useful for predicting customer activity and targeting marketing campaigns. FIG. 11 shows some of the windows 1101 which will be displayed in graphical user interface 203 in such an exploration.

The analyst begins by browsing the domain model (shown in window 1117), locating the CUSTOMER concept, and displaying it in a concept-at-a-glance window 1119. This window displays aggregate information about the set of all customers, in this case the minimum, maximum, and average of the numeric role total-spent-1991. She then goes to work on Customers in analysis work area 1103. Instead of typing a query in 1105, she begins to segment the set of customers by using the form Segment by Numeric Attribute (screen 1109), which has been selected from the "Library of Abstract Queries shown in window 1113. To fill out the form, the analyst specifies the concept to be segmented (CUSTOMER), the role on which to key the segmentation (total-spent-1991), and the attribute values that determine the segments. We assume that the analyst wants to divide Customers into three approximately equal groups, corresponding roughly to low, medium, and high spenders, so she must supply two numbers, say, 500 and 1500. This will result in a segmentation of customers into three classes: those who spent less than $500, those that spent between $500 and $1500, and those that spent more than $1500. Note that the numeric bounds selected, here 500 and 1500, are only best guesses: it is only through further analysis (and perhaps changing the bounds) that the utility of any segmentation can be determined. The results of the segmentation are displayed in an analysis table window 1121. The query and the view it produces are related by an ID#, in this case, 7228. Table 1121 shows the three segments and the number of customers that fell into each segment.

Let us assume that table 1121 indicates that there are many customers who spent only a small amount at the store in 1991; this suggests a class of customers who are not regular customers. To explore the relationship between amount of money spent and regularity of purchasing, the analyst again segments Customers using the Segment by Numeric Attribute form, this time based on the role number-of-purchases-in-1991, to create segments for incidental, semi-regular, and regular purchasers. Suppose the analyst next displays a table of the incidental purchasers and discovers that some spent quite a lot while other spent very little. She now may form the hypothesis that the high spenders are more likely to make purchases during sales.

To investigate this hypothesis, the analyst edits the table of incidental purchasers to show not only the amount they spent, but also the percent of purchases they made during sales. She then can specify that she wants to see a scatter plot of the amount spent vs. the percent sale purchases for each incidental purchaser. If the scatter plot indicates a positive correlation between the percent sale purchases and the amount spent, the analyst may recommend that the store increase the number or length of sales it holds or that it advertise sales more extensively.

Finally, assume that the analyst decides that it is appropriate to permanently track the size and makeup of some of these segments. She can create Classic concepts for the regular purchaser and high spender segments. The table which shows the high spender segment is shown at 1123. By filling out a Monitor Change window 1501, she can specify that she wants to be informed whenever 5% of the customers in the (newly created) Regular-Purchaser concept migrate out of the concept. When incremental updates to the knowledge base are processed, all changes to the classification of individuals in the knowledge base are recorded, and if any of the conditions specified by the analyst are met, the analyst will be notified in window 1115. The store then can take proper action. Much of the foregoing is summarized in FIG. 12, which shows a partial roadmap 1201 of the interaction between the analyst and the user interface.

CONCLUSION

The foregoing Detailed Description has disclosed to those of ordinary skill in the arts to which information retrieval apparatus 201 pertains how to build and use such an apparatus. In the course of that disclosure, it has been further shown to those of ordinary skill in the art how to convert a query into a concept, how to create and use a monitor, and how to use a graph to define a query. While the techniques for building and using the apparatus disclosed herein are the best presently known to the inventors, other implementations will be immediately apparent to those of ordinary skill in the art.

For example, the preferred embodiment employs the CLASSIC knowledge base management system; however, a virtual data base management system can be constructed using any kind of knowledge base system or even an ordinary data base management system to implement the virtual schema and the virtual data base. Similarly, the techniques employed to derive a query from a graph can be practiced in any kind of data base management system while monitors can be used in any knowledge base management system which can reclassify its data. The conversion of a query to a concept, finally, can be accomplished in any knowledge base management system which is able to add a new concept. Additionally, other algorithms and data structures may be used to attain the same ends as the ones disclosed herein and the apparatus may be implemented in systems having other kinds of user interfaces than the graphical user interface disclosed herein.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted in light of the Detailed Description and in accordance with the Doctrine of Equivalents.

What is claimed is:

1. In an information retrieval system, a method for organizing a body of information comprising:

establishing a knowledge base containing said body of information, said knowledge base including descriptions of individuals and of concepts to which the individuals belong, the descriptions being classified into a generalization ordering;

responding to a query specifying a collection of the individuals by making a collection specification which is one of the descriptions and which specifies the collection of individuals; and receiving the collection specification and classifying the collection specification into the generalization ordering.

2. In an information retrieval system including a knowledge base containing a body of information, the knowledge base including descriptions of individuals and of concepts to which the individuals belong, the descriptions being classified into a generalization ordering, a method for detecting a change in the body of information contained in the knowledge base, the method comprising the steps of:

making an alteration with regard to one or more of the individuals;

making a change in a relationship between the one or more individuals and the concepts as required by the alteration and the concepts; and indicating an effect of the change with regard to one or more of the individuals.

3. A method for retrieving data from one or more database management systems, the method comprising the steps of:

organizing the data in a knowledge base which includes descriptions of individuals and of concepts to which the individuals belong, the descriptions being classified into a generalization ordering, and operating on the data in response to expressions stated in a description language which employs the concepts;

receiving the expressions from the knowledge base, translating the expressions into first queries and providing the first queries to the database management systems, receiving the data from the database management systems, and incorporating the received data together with the expressions into the knowledge base; and receiving second queries specifying certain of the data and responding thereto by translating the second queries into expressions which specify retrieval of the certain data from the knowledge base, and providing the certain data.

4. A program storage device, readable by a computer having a memory, tangibly embodying one or more programs of instructions for organizing a body of information within an information retrieval system, said programs of instruction being executable by the computer to perform the steps of:

establishing a knowledge base containing said body of information, said knowledge base including descriptions of individuals and of concepts to which the individuals belong, the descriptions being classified into a generalization ordering;

responding to a query specifying a collection of the individuals by making a collection specification which is one of the descriptions and which specifies the collection of individuals; and receiving the collection specification and classifying the collection specification into the generalization ordering.

5. A program storage device, readable by a computer having a memory and an information retrieval system including a knowledge base containing a body of information, the knowledge base including descriptions of individuals and of concepts to which the individuals belong, the descriptions being classified into a generalization ordering, said program storage device tangibly embodying one or more programs of instructions for detecting a change in the body of information contained in the knowledge base, said programs of instruction being executable by the computer to perform the steps of:

making an alteration with regard to one or more of the individuals;

making a change in a relationship between the one or more individuals and the concepts as required by the alteration and the concepts; and indicating an effect of the change with regard to one or more of the individuals.

6. A program storage device, readable by a computer having a memory and including one or more database management systems, said program storage device tangibly embodying one or more programs of instructions for retrieving data from said database management systems, said programs of instruction being executable by the computer to perform the steps of:

organizing the data in a knowledge base which includes descriptions of individuals and of concepts to which the individuals belong, the descriptions being classified into a generalization ordering, and operating on the data in response to expressions stated in a description language which employs the concepts;

receiving the expressions from the knowledge base, translating the expressions into first queries and providing the first queries to the database management systems, receiving the data from the database management systems, and incorporating the received data together with the expressions into the knowledge base; and receiving second queries specifying certain of the data and responding thereto by translating the second queries into expressions which specify retrieval of the certain data from the knowledge base, and providing the certain data.

\* \* \* \* \*